United States Patent
Ambasta et al.

(10) Patent No.: US 9,535,979 B2
(45) Date of Patent: *Jan. 3, 2017

(54) MULTIFACETED SEARCH

(71) Applicant: International Business Machines Corporation, Armonk, NY (US)

(72) Inventors: Rohan A. Ambasta, Pune (IN); Bharath Ganesh, Trivandrum (IN); Parag S. Gokhale, Pune (IN); Chandrashekhar Jain, Pune (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/923,406

(22) Filed: Jun. 21, 2013

(65) Prior Publication Data

US 2014/0379728 A1 Dec. 25, 2014

(51) Int. Cl.
*G06F 17/30* (2006.01)

(52) U.S. Cl.
CPC ... *G06F 17/30622* (2013.01); *G06F 17/30011* (2013.01); *G06F 17/30864* (2013.01)

(58) Field of Classification Search
CPC ................................................ G06F 17/30622
See application file for complete search history.

(56) References Cited

U.S. PATENT DOCUMENTS

| | | | |
|---|---|---|---|
| 7,069,263 B1 | 6/2006 | Yee et al. | |
| 7,080,091 B2 | 7/2006 | Matsuda | |
| 7,149,748 B1 | 12/2006 | Stephan | |
| 7,392,250 B1* | 6/2008 | Dash | G06F 17/30539 707/600 |
| 7,496,568 B2 | 2/2009 | Broder et al. | |
| 7,587,410 B2 | 9/2009 | Souror et al. | |
| 7,606,781 B2 | 10/2009 | Sweeney et al. | |
| 7,716,211 B2 | 5/2010 | Peltonen et al. | |

(Continued)

FOREIGN PATENT DOCUMENTS

WO 2006096812 A2 9/2006

OTHER PUBLICATIONS

Ambasta et al., "Multifaceted Search," U.S. Appl. No. 14/488,664, filed Sep. 17, 2014.

(Continued)

*Primary Examiner* — Mohammad S Rostami
(74) *Attorney, Agent, or Firm* — Robert J. Shatto

(57) ABSTRACT

A query is received that includes two or more facets of a multidimensional inverted index for a collection of documents. Each document is associated with at least one facet. Generation of the multidimensional inverted index includes creating one or more entries. Each entry includes a combination of two or more facets and a posting list of indications for the documents associated with respective facets of each entry. Each indication identifies a document. Generation of the index also includes determining documents associated with respective facets of the combination of each entry. The multidimensional inverted index is searched for an entry having the combination of two or more facets included in the query and a search result is returned. An indication for a document may be included in a posting list if it is determined that the document is associated with each facet of the combination of facets of the entry.

17 Claims, 9 Drawing Sheets

(56) References Cited

U.S. PATENT DOCUMENTS

| | | | |
|---|---|---|---|
| 7,720,837 B2 | 5/2010 | Kusnitz et al. | |
| 7,730,059 B2 | 6/2010 | Behnen et al. | |
| 7,761,407 B1 | 7/2010 | Stern | |
| 7,765,216 B2 | 7/2010 | Li et al. | |
| 7,870,114 B2 | 1/2011 | Zhang et al. | |
| 8,032,532 B2* | 10/2011 | Broder | G06F 17/30622 707/742 |
| 8,266,148 B2 | 9/2012 | Guha et al. | |
| 8,510,306 B2 | 8/2013 | Carmel et al. | |
| 8,631,031 B1* | 1/2014 | Kepner | G06F 17/30587 707/769 |
| 2002/0198885 A1 | 12/2002 | Streepy | |
| 2004/0039990 A1 | 2/2004 | Bakar et al. | |
| 2008/0010251 A1* | 1/2008 | Fontoura et al. | 707/3 |
| 2008/0126335 A1* | 5/2008 | Gandhi | G06F 17/30622 |
| 2008/0133473 A1* | 6/2008 | Broder et al. | 707/3 |
| 2008/0313140 A1 | 12/2008 | Pereira et al. | |
| 2009/0327271 A1 | 12/2009 | Amitay et al. | |
| 2010/0097407 A1* | 4/2010 | Zulch | G01J 3/504 345/690 |
| 2011/0047159 A1 | 2/2011 | Baid et al. | |
| 2011/0131202 A1* | 6/2011 | Cohen | G06F 17/30702 707/723 |
| 2011/0246458 A1 | 10/2011 | Tuchman et al. | |
| 2012/0030152 A1* | 2/2012 | Pueyo | G06F 17/30867 706/12 |
| 2013/0024440 A1* | 1/2013 | Dimassimo | G06F 17/30864 707/709 |
| 2013/0211927 A1* | 8/2013 | Kellogg | G06N 7/00 705/14.73 |
| 2014/0280068 A1* | 9/2014 | Dhoopar | G06F 17/30554 707/722 |
| 2014/0280207 A1* | 9/2014 | Renders | G06F 17/3053 707/748 |
| 2015/0227624 A1 | 8/2015 | Busch et al. | |

OTHER PUBLICATIONS

Ben-Yitzhak et al., "Beyond Basic Faceted Search", WSDM' 08 Proceedings of the 2008 International Conference on Web Search and Data Mining, Feb. 11-12, 2008, Palo Alto, CA, pp. 33-43, © 2008 ACM. DOI: 10.1145/1341531.1341539.

Gray et al., "Data Cube: A Relational Aggregation Operator Generalizing Group-By, Cross-Tab, and Sub-Totals", Microsoft Research, Technical Report, MSR-TR-97-32, May 1997, Appeared in: Data Mining and Knowledge Discovery 1(1):29-53(1997).

Janet et al., "Cube Index: A Text Index Model for Retrieval and Mining", International Journal of Computer Application, vol. 1, No. 9, pp. 88-92, © 2010 IJCA Journal, Published by: Foundation of Computer Science. DOI: 10.5120/192-330.

Simitsis et al., "Multidimensional Content eXploration", VLDB' 08 Proceedings of the VLDB Endowment, Aug. 24-30, 2008, Auckland, New Zealand, © 2008 VLDB Endowment.

* cited by examiner

```
DOCUMENT: D12

FACET
FROM:    JACK
TO:      ROB
DATE:    2011/Q3/AUG
CONTENT: . . . .
```
520

|  | POSTING LIST |
|---|---|
| FROM/ROB | {D1} |
| FROM/BOB | {D6, D7, D8, D9} |
| → FROM/BILL (622) | {D3, D4, D5} |
| FROM/JACK | {D2, D10, D11, D12} |
| TO/ROB | {D2, D3, D7, D12} |
| TO/BOB | {D4, D10} |
| TO/BILL | {D1, D8, D11} |
| TO/JACK | {D5, D6, D9} |
| DATE/2010 | {D2, D3, D4, D5, D6, D7, D9, D10, D11} |
| DATE/2010/Q1 | {D2, D4, D5, D6, D9, D10} |
| DATE/2010/Q1/JAN | {D10} |
| → DATE/2010/Q1/FEB (624) | {D4, D6, D9} |
| DATE/2010/Q1/MAR | {D2, D5} |
| DATE/2010/Q2 | {D3, D7, D11} |
| DATE/2010/Q2/MAY | {D11} |
| DATE/2010/Q2/JUN | {D3, D7} |
| DATE/2011 | {D1, D8, D12} |
| DATE/2011/Q3 | {D1, D12} |
| DATE/2011/Q3/AUG | {D12} |
| DATE/2011/Q3/SEP | {D1} |
| DATE/2011/Q4 | {D8} |
| DATE/2011/Q4/NOV | {} |
| DATE/2011/Q4/DEC | {D8} |

|  |  | POSTING LIST |
|---|---|---|
| FROM/ROB, | DATE/2010 | {} |
| FROM/ROB, | DATE/2011 | {D1} |
| FROM/ROB, | DATE/2011/Q3 | {D1} |
| FROM/ROB, | DATE/2011/Q3/SEP | {D1} |
| FROM/BOB, | DATE/2010 | {D6, D7, D9} |
| FROM/BOB, | DATE/2010/Q1 | {D6, D9} |
| FROM/BOB, | DATE/2010/Q1/JAN | {} |
| FROM/BOB, | DATE/2010/Q1/FEB | {D6, D9} |
| FROM/BOB, | DATE/2010/Q1/MAR | {} |
| FROM/BOB, | DATE/2010/Q2/MAY | {} |
| FROM/BOB, | DATE/2010/Q2/JUN | {D7} |
| FROM/BOB, | DATE/2011 | {D8} |
| FROM/BOB, | DATE/2011/Q4/NOV | {} |
| FROM/BOB, | DATE/2011/Q4/DEC | {D8} |
| FROM/BILL, | DATE/2010 | {D3, D4, D5} |
| FROM/BILL, | DATE/2010/Q1 | {D4, D5} |
| FROM/BILL, | DATE/2010/Q1/JAN | {} |
| FROM/BILL, | DATE/2010/Q1/FEB | {D4} |
| FROM/BILL, | DATE/2010/Q1/MAR | {D5} |
| FROM/BILL, | DATE/2010/Q2 | {D3} |
| FROM/BILL, | DATE/2010/Q2/MAY | {} |
| FROM/BILL, | DATE/2010/Q2/JUN | {D3} |
| FROM/BILL, | DATE/2011 | {} |
| FROM/JACK, | DATE/2010 | {D2, D10, D11} |
| FROM/JACK, | DATE/2010/Q1 | {D2, D10} |
| FROM/JACK, | DATE/2010/Q1/JAN | {D10} |
| FROM/JACK, | DATE/2010/Q1/FEB | {} |
| FROM/JACK, | DATE/2010/Q1/MAR | {D2} |
| FROM/JACK, | DATE/2010/Q2 | {D11} |
| FROM/JACK, | DATE/2010/Q2/MAY | {D11} |
| FROM/JACK, | DATE/2010/Q2/JUN | {} |
| FROM/JACK, | DATE/2011 | {D12} |
| FROM/JACK, | DATE/2011/Q3/AUG | {D12} |
| FROM/JACK, | DATE/2011/Q3/SEP | {} |

FIG. 7

|  | POSTING LIST |
|---|---|
| FROM/ROB, TO/BOB | {} |
| FROM/ROB, TO/BILL    ← 822 | {D1} |
| FROM/ROB, TO/JACK | {} |
| FROM/BOB, TO/ROB | {D7} |
| FROM/BOB, TO/BILL | {D8} |
| FROM/BOB, TO/JACK | {D6, D9} |
| FROM/BILL, TO/ROB | {D3} |
| FROM/BILL, TO/BOB | {D4} |
| FROM/BILL, TO/JACK | {D5} |
| FROM/JACK, TO/ROB    ← 824 | {D2, D12} |
| FROM/JACK, TO/BOB | {D10} |
| FROM/JACK, TO/BILL | {D11} |

|  | POSTING LIST |
|---|---|
| . . . . | . |
| FROM/ROB, DATE/2011/Q4/DEC, TO/JACK, | {} |
| FROM/BOB, DATE/2010, TO/ROB, | {D7} |
| FROM/BOB, DATE/2010, TO/BILL, | {} |
| FROM/BOB, DATE/2010, TO/JACK, | {D6, D9} |
| FROM/BOB, DATE/2010/Q1, TO/ROB, | {} |
| FROM/BOB, DATE/2010/Q1, TO/BILL, | {} |
| FROM/BOB, DATE/2010/Q1, TO/JACK, | {D6, D9} |
| FROM/BOB, DATE/2010/Q1/JAN, TO/ROB, | {} |
| FROM/BOB, DATE/2010/Q1/JAN, TO/BILL, | {} |
| FROM/BOB, DATE/2010/Q1/JAN, TO/JACK, | {} |
| FROM/BOB, DATE/2010/Q1/FEB, TO/ROB, | {} |
| FROM/BOB, DATE/2010/Q1/FEB, TO/BILL, | {} |
| 922 → FROM/BOB, DATE/2010/Q1/FEB, TO/JACK, | {D6, D9} |
| FROM/BOB, DATE/2010/Q1/MAR, TO/ROB, | {} |
| FROM/BOB, DATE/2010/Q1/MAR, TO/BILL, | {} |
| FROM/BOB, DATE/2010/Q1/MAR, TO/JACK, | {} |
| FROM/BOB, DATE/2010/Q2, TO/ROB, | {} |
| FROM/BOB, DATE/2010/Q2, TO/BILL, | {D7} |
| FROM/BOB, DATE/2010/Q2, TO/JACK, | {} |
| FROM/BOB, DATE/2010/Q2/MAY, TO/ROB, | {} |
| FROM/BOB, DATE/2010/Q2/MAY, TO/BILL, | {} |
| FROM/BOB, DATE/2010/Q2/MAY, TO/JACK, | {} |
| FROM/BOB, DATE/2010/Q2/JUN, TO/ROB, | {D7} |
| FROM/BOB, DATE/2010/Q2/JUN, TO/BILL, | {} |
| FROM/BOB, DATE/2010/Q2/JUN, TO/JACK, | {} |
| FROM/BOB, DATE/2011, TO/ROB, | {} |
| FROM/BOB, DATE/2011, TO/BILL, | {D8} |
| FROM/BOB, DATE/2011, TO/JACK, | {} |
| FROM/BOB, DATE/2011/Q4, TO/ROB, | {} |
| FROM/BOB, DATE/2011/Q4 TO/BILL | {D8} |
| FROM/BOB, DATE/2011/Q4, TO/JACK, | {} |
| FROM/BOB, DATE/2011/Q4/NOV, TO/ROB, | {} |
| FROM/BOB, DATE/2011/Q4/NOV, TO/BILL, | {} |
| FROM/BOB, DATE/2011/Q4/NOV, TO/JACK, | {} |
| 924 FROM/BOB, DATE/2011/Q4/DEC, TO/ROB, | {} |
| → FROM/BOB, DATE/2011/Q4/DEC, TO/BILL, | {D8} |
| FROM/BOB, DATE/2011/Q4/DEC, TO/JACK, | {} |
| FROM/BILL, DATE/2010, TO/ROB, | {D3} |
| . . . . | . |

MULTIFACETED SEARCH

FIELD

The disclosure relates generally to indices that may be used in a search of a document or a collection of documents, and more particularly, to indices that may be used in a multifaceted search, including a multifaceted search in a business intelligence application.

BACKGROUND

A search engine may be used to locate particular documents in a collection of documents. In addition, a search engine may be used to locate particular keywords or phrases in a document. Search engines may use one or more indices to locate particular documents, keywords, or phrases. In addition, search engines may perform Boolean and other operations in the course of locating particular information. Search engines may require significant time to perform a search. Indices that reduce the time required to perform a search are generally beneficial.

SUMMARY

Embodiments of the disclosure provide a method, system, and computer program product for multifaceted searching. The method, system, and computer program product include receiving a query. The query includes two or more facets of a multidimensional inverted index for a collection of documents. Each document in the collection is associated with at least one facet. Generation of the multidimensional inverted index includes: (a) creating one or more entries, each entry including a combination of two or more facets; (b) determining documents associated with respective facets of the combination of two or more facets of each entry; and (c) creating a posting list of indications for the documents associated with respective facets of each entry, each indication identifying a document. In addition to receiving a query, the method, system, and computer program product include searching the multidimensional inverted index for an entry matching the combination of two or more facets included in the query. Further, the method, system, and computer program product include returning a search result.

In various embodiments, the determining of documents associated with respective facets of the combination of two or more facets of each entry includes determining that a document is associated with each facet of the two or more facets.

BRIEF DESCRIPTION OF THE DRAWINGS

FIG. 6 is an exemplary inverted index for the exemplary taxonomy of FIG. 4 in accordance with various embodiments.

FIG. 7 is an exemplary multidimensional inverted index for the exemplary taxonomy of FIG. 4 in accordance with various embodiments.

FIG. 8 is an exemplary multidimensional inverted index for the exemplary taxonomy of FIG. 4 in accordance with various embodiments.

FIG. 9 is an exemplary multidimensional inverted index for the exemplary taxonomy of FIG. 4 in accordance with various embodiments.

Like reference numbers and designations in the various drawings indicate like elements.

DETAILED DESCRIPTION

According to various embodiments, each document in a collection is associated with at least one facet or category. A computer system is configured to store a multidimensional inverted index for the collection of documents. A query is received by the computer system. The query includes two or more facets of a multidimensional inverted index. The multidimensional inverted index may be generated incrementally as queries are received, i.e., each time a query is received. If the index does not include an entry that matches the query, a new entry is generated and added to the index. Alternatively, the multidimensional inverted index may be wholly or partially generated prior to receiving queries. Multiple multidimensional inverted indices may be provided, wherein each index includes a different combination of two or more facets. The computer system is configured to search a multidimensional inverted index for an entry having the combination of two or more facets that are included in or that match the query and to return a search result.

A multidimensional inverted index includes one or more entries. Each entry includes a combination of two or more facets. In addition, each entry includes a posting list of indications. Each indication identifies a document in the collection. A posting list is a list of indications for documents that are associated with the respective facets in the combination of facets of the entry. Accordingly, generation of a multidimensional inverted index includes determining which documents are associated with respective facets of the combination of two or more facets of each entry.

In various embodiments, documents may be associated with the respective facets in the combination of facets of the entry by a union, intersection, or symmetric difference type association.

Advantageously, the embodiments disclosed in this Detailed Description may be used in connection with a variety of business intelligence applications. As one example, the disclosed embodiments may be used as part of an online analytical processing application for answering multidimensional analytical queries.

Figure 3:
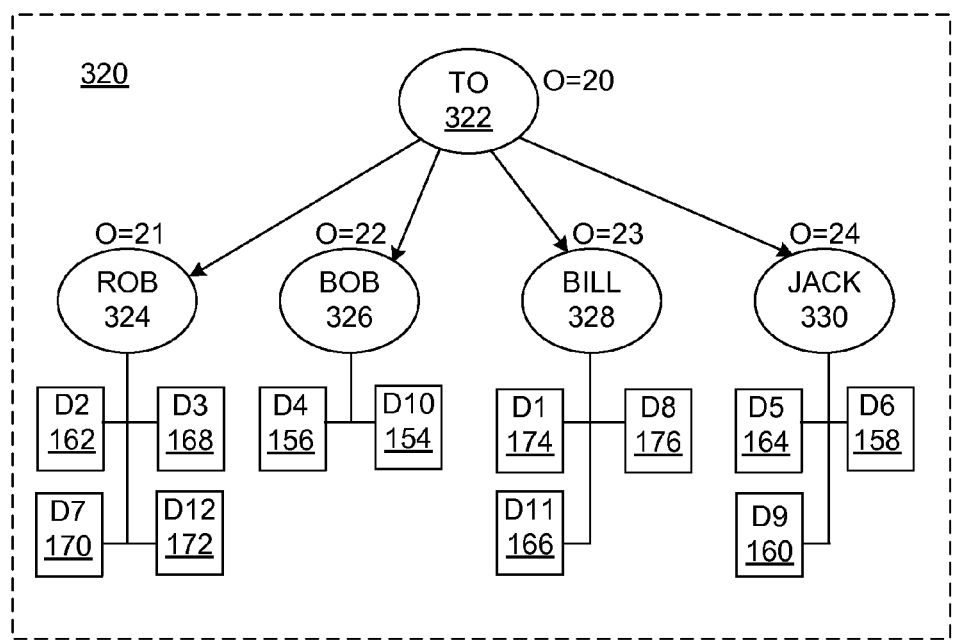
FIG. 3 illustrates a recipient facet of the exemplary taxonomy of multifaceted documents in accordance with various embodiments.
Figures 4, 5:
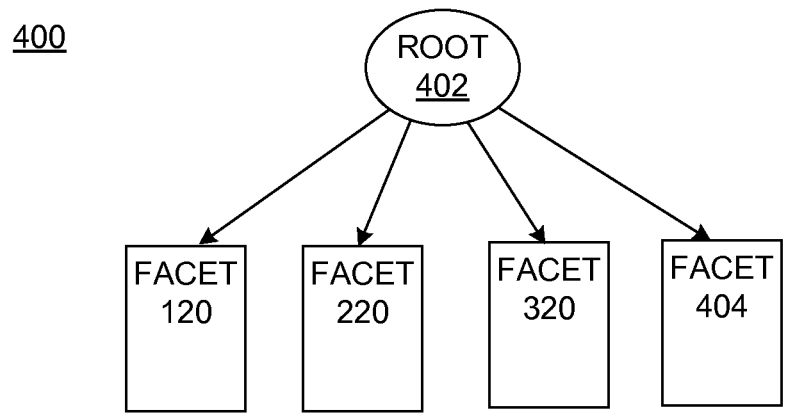
FIG. 4 illustrates the exemplary taxonomy of multifaceted documents referenced in FIGS. 1, 2, and 3 in accordance with various embodiments.
FIG. 5 depicts a document record used by a system in accordance with various embodiments.

FIG. 4 illustrates an exemplary taxonomy 400 of multifaceted documents in accordance with various embodiments. The taxonomy 400 includes a virtual root node 402, facet 120, facet 220, facet 320, and facet 404. In this example, the documents are email documents. The facets 120, 220, and 320 are, respectively, date, sender, and recipient facets or classifications. The facet 404 may be a binary indicator indicating whether the document includes an attachment document. In addition, the facet 404 may be an attachment type or size classification. Subclassifications of facets 120, 220, and 320 are further described with respect to FIGS. 1, 2, and 3. The exemplary taxonomy 400 may include additional facets.

While the documents in the example of FIGS. 1-4 are email documents, the principles described in this Detailed Description may be used with any suitable type of virtual or physical document. For example, the documents may be descriptions of commercial products, academic articles, descriptions of biological organisms, patent applications, or descriptions of pathologies. Further while the example indices presented in this Detailed Description refer to date, sender, and recipient facets, any property of the information contained in any of the documents stored in a taxonomic database that is useful or helpful for classifying the documents may be designated as a facet in accordance with various embodiments.

Facets may be used to classify a collection of documents (or words or phrases within one or more documents). As further described below, a facet may be a hierarchy of classifications that may be represented by a tree structure that classifies items by facet or classification and, optionally, one or more subclassifications within the facet. Classifying objects with facets allows the objects to be ordered in multiple ways. Facets for a collection of documents may be determined at any time based on organizations that appear to be useful at the time. Should additional facets later be discovered to be useful, they may be added to an initial set of facets at a later time. Facets for a particular collection of documents may be identified or determined using any known method.

Figure 1:
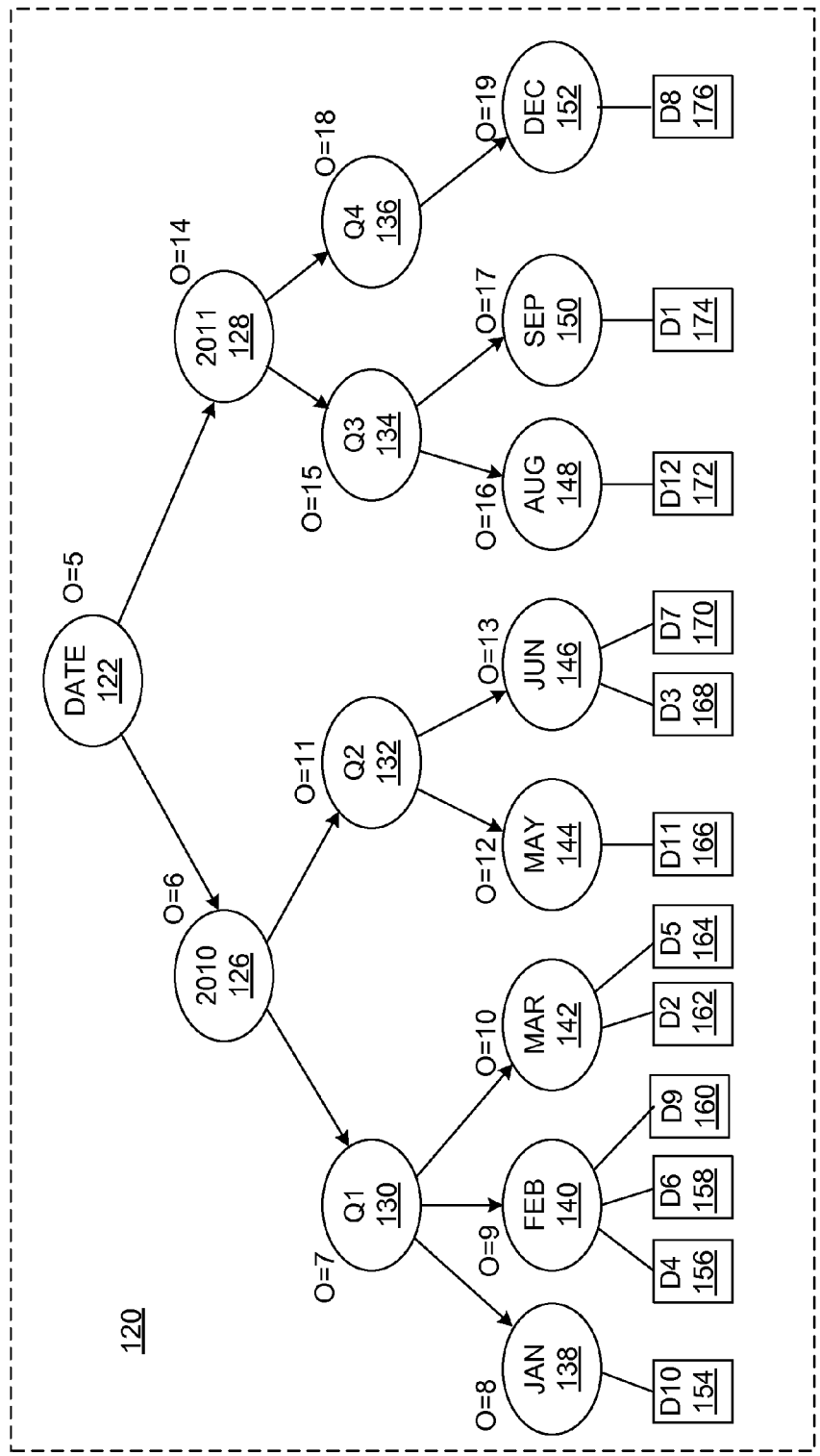
FIG. 1 illustrates a date facet of an exemplary taxonomy of multifaceted documents in accordance with various embodiments.

FIG. 1 illustrates the date facet 120 of the exemplary taxonomy 400 of multifaceted documents in accordance with various embodiments. The date facet 120 includes a "date" root, 122 and two facets that classify documents by years 2010 and 2011 (reference numbers 126, 128). Subclassifications under the 2010 year classification include quarters Q1 and Q2 (reference numbers 130, 132). Subclassifications under the 2011 year classification quarters Q3 and Q4 (reference numbers 134, 136). Various month subclassifications are provided for each of the quarter subclassifications. January, February, and March subclassifications (reference numbers 138, 140, 142) are provided under 2010 quarter Q1. May and June subclassifications (reference numbers 144, 146) are provided under 2010 quarter Q2. August and September subclassifications (reference numbers 148, 150) are provided under 2011 quarter Q3. A December sub-classification (reference numbers 152) is provided under 2011 quarter Q4.

Each classification or sub-classification may be referred to as a node and may be identified by an ordinal. For example, the date root node 122 may be identified by the ordinal five. As another example, the August, 2011 subclassification node 148 may be identified by the ordinal 16. Ordinals may be used to specify a path to a document.

Documents D1, D2, D3, D4, D5, D6, D7, D8, D9, D10, D11, and D12 (reference numbers 154, 162, 168, 156, 164, 158, 170, 176, 160, 154, 166, and 172, respectively) in a collection of documents are shown with a line connecting a document to the month node associated with the date of the document. For example, document D10, 154 contains a date, e.g., date created, in January 2010. The document D10 is connected by a line with the January 2010 node 138.

In the tree illustrated in FIG. 1, the date facet 120 does not include every month or every quarter for the years 2010 and 2011. Rather the date facet 120 includes only the subclassifications needed to classify 12 exemplary documents. The tree is depicted in incomplete form for convenience of illustration. If a thirteenth document with a date in October of 2010 were added to the example, an additional quarter and month nodes would be added to the date facet 120. In various embodiments, a facet may be represented by a full or incomplete tree. Similarly, other facets described in this Detailed Description may omit subclassifications that are not needed to classify the exemplary documents.

Figure 2:
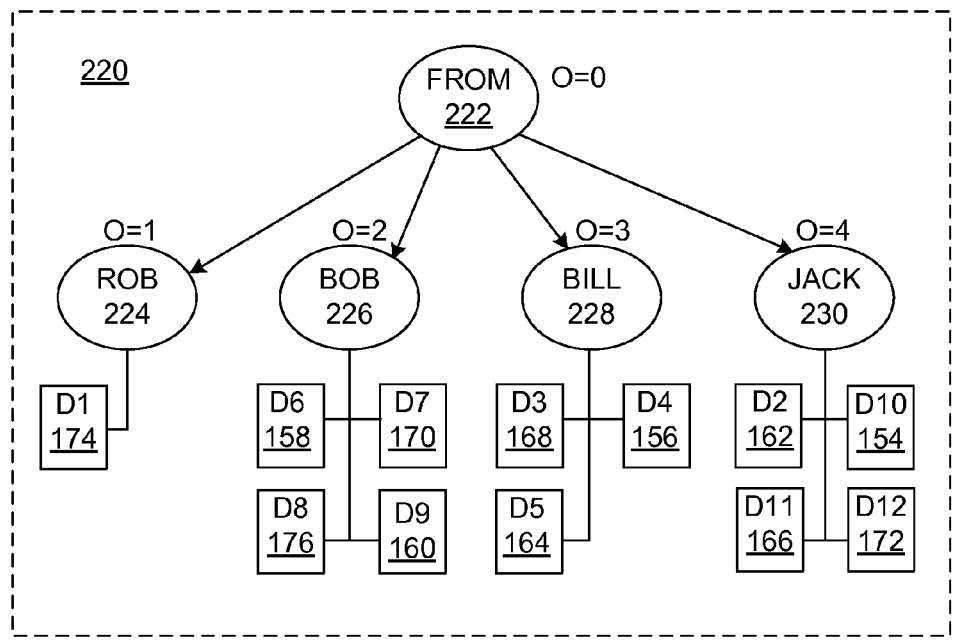
FIG. 2 illustrates a sender facet of the exemplary taxonomy of multifaceted documents in accordance with various embodiments.

FIG. 2 illustrates the sender facet of the exemplary taxonomy of multifaceted documents in accordance with various embodiments. The sender facet 220 includes a "from" root, 222 and four facets that classify the exemplary documents by one of four senders Rob, Bob, Bill, and Jack (reference numbers 224, 226, 228, and 230, respectively). As with the date facet 120, each node may be identified by an ordinal. Documents D1-D12 (reference numbers 154-176) are shown with a line connecting a document to the sender node associated with the sender of the document. For example, document D2, 162 contains a sender name of Jack (node 230). The document D2 is connected by a line with the node 230.

FIG. 3 illustrates the recipient facet of the exemplary taxonomy of multifaceted documents in accordance with various embodiments. The recipient facet 320 includes a "to" root, 322 and four facets that classify documents by recipients Rob, Bob, Bill, and Jack (reference numbers 324, 326, 328, and 330, respectively). As with the date facet 120, each node may be identified by an ordinal. Documents D1-D12 (reference numbers 154-176) are shown by a line connecting a document to the recipient node associated with the recipient of the document. For example, document D8, 176 contains a recipient name of Bill (node 328). The document D8 is connected by a line with the node 328.

FIGS. 1-3 illustrate that a document can be included in multiple facets. For example, FIG. 1 shows that document D10 is included in facets 126 (DATE/2010), 130 (DATE/2010/Q1), and 138 (DATE/2010/Q1/JAN). FIG. 2 shows that document D10 is included in facet 230 (FROM/JACK). FIG. 3 shows that document D10 is included in facet 326 (TO/BOB).

FIG. 5 depicts a document record 520 that may be used by a computer system 1100 in accordance with various embodiments. The computer system 1100 is described with reference to FIG. 11. The system 1100 may have a document record 520 for each document in a collection of documents. For example, a unique document record 520 may be created for each of the exemplary documents D1-D12, 154-176. The document record 520 may be created when a new document is added to the collection. In various embodiments, the document record 520 includes an identifier of the particular document, e.g., D12, and values for various facets associated with the document. For example, the document D12 includes the "from" facet having a value of "Jack," the "to" facet having a value of "Rob," and the "date" facet having a value of "2011/Q3/Aug." The document D12 may include additional facets. In various embodiments, the document record 520 includes information about the facets associated with the document, denoted "content" in FIG. 5.

An inverted index may include a vocabulary of facets used to classify a collection of documents, which may be referred to in the art as a record-level inverted index. In addition, an inverted index may include a vocabulary of various terms or phrases that occur in a document or a collection of documents, which may be referred to in the art as a word-level inverted index. The terms in the vocabulary may be referred to as "index terms." An inverted list may be created for each index term, i.e., an inverted list may be created for each facet, for each term or phrase, or for both. The index terms may be arranged in a data structure, such as a B-tree. FIGS. 1-4 are examples of tree structures where the index terms are facets. An inverted list also includes one or more postings, where each posting identifies one or more documents in the collection. A posting may include additional information. For example, in the context of a record-level inverted index, the posting may include the number of documents in the facet. In the context of a word-level inverted index, the posting may include the frequency of the index term in the document.

FIG. 6 is an exemplary record-level, one-dimensional inverted index 620 for the exemplary taxonomy 400 of FIG. 4 in accordance with various embodiments. The inverted index 620 associates each facet with a posting list of documents in the exemplary collection of documents. The inverted index 620 includes a single facet column that lists each of the classifications and subclassifications for the facets illustrated in FIGS. 1-3, i.e., FROM, TO, and DATE. In an embodiment, the inverted index 620 may include additional facets and their respective classifications and subclassifications, such as facet 404. As an example, an additional facet DATE/2011/Q4/NOV is included in the example of FIG. 6. In addition, the inverted index 620 includes a posting list column. Each entry in the posting list identifies documents associated with a particular facet. For example, the FROM/BOB facet identifies documents D6, D7, D8, and D9 as being associated with the facet. The posting list also includes an empty set indicator { }, if there are not any documents associated with the particular facet. For example, there are no documents associated with the DATE/2011/Q4/NOV facet.

A search query may include one or more terms and may include one or more Boolean operators. The search terms may be index terms or non-indexed words or phrases. The terms in a search query may specified be typing them into a search box or on a search line in a user interface. In addition, a search query may be specified by selecting index terms in a user interface, such as by checking boxes associated with particular facets.

A search engine 1152 (FIG. 11) evaluating a search query traverses the inverted index 620 once for each index term included in the query. The search engine may traverse the inverted index 620 from top to bottom (or bottom to top, or use a search algorithm) until the particular classification or subclassification is found. For example, consider the query: "facet: DATE/2011/Q3/SEP." The inverted index 620 may be traversed from the top until this facet is found. The query returns document D1.

A search query may include two or more facets and the Boolean AND operator. A search query having two or more index terms may be referred to in this Detailed Description and the Claims as a "multifaceted" search query. Evaluating a multifaceted search query may require traversing an inverted index such as the index 620 multiple times, e.g., once for each facet, and returning multiple search results. In addition, evaluating a multifaceted search query may require performing a Boolean operation on the multiple search results that are returned. For example, consider the search query: "facet: DATE/2010/Q1/FEB AND facet: FROM/BILL." The inverted index 620 is first traversed to obtain the first search results of documents {D4, D6, D9} associated with the entry for DATE/2010/Q1/FEB facet (arrow 624). The inverted index 620 is next traversed to obtain the second search results of documents {D3, D4, D5} associated with the entry for the FROM/BILL facet (arrow 622). The Boolean AND operator is applied to the first and second search results to obtain the intersection of the two search results and form the final search result {D4}.

The processing time necessary to evaluate a multifaceted search query using the inverted index 620 may be expected to increase as the number of index terms included and Boolean operations included in the query increases. Long processing times for evaluating search queries are generally undesirable.

FIG. 7 is an exemplary record-level multidimensional ("MD") inverted index 720 for the exemplary taxonomy 400 of FIG. 4 in accordance with various embodiments. The inverted index 720 associates two facets with a posting list of documents in the exemplary collection of documents. Each entry in the MD inverted index 720 includes a field that lists a combination of facets. Specifically, this field lists various subclassifications for the FROM facet illustrated in FIG. 2 and classifications and subclassifications for the DATE facet illustrated in FIG. 1. In addition, the MD inverted index 720 includes a posting list field that includes a list of document identifiers that identify documents associated with the combination of facets. Specifically, the posting list field identifies documents in the intersection of the posting lists of the associated FROM and DATE facets. For example, the arrow 724 identifies an entry for the combination FROM/BILL and DATE/2010/Q1/FEB. This entry identifies document D4 as being associated with the intersection of the posting lists for the two facets. In addition, each entry in the MD inverted index 720 may include a field (not shown) that lists quantitative aggregations, such as numerical aggregations over fields of the documents in the posting list, or qualitative aggregations, such as arithmetic or Boolean operations applied to metadata attributes associated with the documents.

In various embodiments, each entry in an MD inverted index includes a posting list field that associates documents with two or more facets. In addition, the documents, if any, in a posting list are related to the two or more associated facets of the entry by being members of a particular type of set. For example, for two facets A and B: the set may be the set that is the intersection of documents associated with A and B; the set may be the set that is the union of documents associated with A and B; or the set may be the set that is the symmetric difference of documents associated with of A and B. Accordingly, in various embodiments, an operation may be performed to determine documents that are associated with respective facets of the combination of two or more facets of a particular entry in a multifaceted index. This determining operation may include determining that a document is associated with each facet of the two or more facets, i.e., the intersection. In addition, the determining operation may include determining that a document is associated with at least one facet of the two or more facets, i.e., the union. Further, the determining operation may include determining that a document is associated with only one facet of the two or more facets, i.e., the symmetric difference.

Searches of the index 720 are performed on the field that lists a combination of facets. A search performed by the search engine 1152 using a two-dimensional MD inverted index may start at the top (or bottom) of the index and traverse (or otherwise search) until the entry that matches the index terms of the FROM and DATE facets specified in the search query is found. For example, consider the same multifaceted search query used in the above example for inverted index 620: "facet: DATE/2010/Q1/FEB AND facet: FROM/BILL." In FIG. 7, the MD inverted index 720 is searched until an entry matching the index terms FROM/BILL and DATE/2010/Q1/FEB" (arrow 722) is found. The search returns document D4.

The example above with respect to FIG. 6 illustrates that an exemplary multifaceted search query requires two searches of the inverted index 620 followed by the performance of a Boolean operation on the results of the two searches. In contrast, the example above with respect to FIG. 7 illustrates that the same exemplary multifaceted search query requires a single search of the MD inverted index 720 and no Boolean operations. The processing time necessary to evaluate a multifaceted search query using the MD inverted index 720 may be expected to take approximately the same amount of processing time without regard to whether one or two index terms are included in the search query. Moreover, a multifaceted search query using the MD inverted index 720 may be expected to take less processing time than the same multifaceted search using the inverted index 620.

FIG. 8 is an exemplary record-level multidimensional ("MD") inverted index 820 for the exemplary taxonomy 400 of FIG. 4 in accordance with various embodiments. Each entry in the inverted index 820 associates a combination of two facets (FROM and TO) with a posting list of documents in the exemplary collection of documents. Each entry in the MD inverted index 820 includes a field that lists a combination of the two facets. Specifically, this field lists various subclassifications for the FROM facet illustrated in FIG. 2 and various subclassifications for the TO facet illustrated in FIG. 3. In addition, the MD inverted index 820 includes a posting list field that includes a list of document identifiers that identify documents associated with the combination of facets. Specifically, the posting list field identifies documents in the intersection of the posting lists of the associated FROM and TO facets. For example, the pair of facet FROM/ROB and facet TO/BILL (arrow 822) identifies document D1 as being associated with the intersection of the posting lists for the two facets. In addition, each entry in the MD inverted index 820 may include a field (not shown) that lists quantitative aggregations, such as numerical aggregations over fields of the documents in the posting list, or qualitative aggregations, such as arithmetic or Boolean operations applied to metadata attributes associated with the documents.

Searches of the index 820 are performed on the field that lists a combination of facets. A multifaceted search query using the MD inverted index 820 may be performed by the search engine 1152 in a similar manner as that described for the MD inverted index 720. For example, consider the multifaceted search query with the following index terms: "facet: TO/ROB AND facet: FROM/JACK." As a preliminary step the query may be normalized so that the index terms correspond with the same order as the facets in the field of the MD inverted index 820. Because the search query first lists the TO facet, which corresponds with the TO of the MD inverted index 820, the search query may be reordered as follows: "facet: FROM/JACK AND facet: TO/ROB." In FIG. 8, the MD inverted index 820 may be traversed (or otherwise searched) until the index term FROM/JACK and TO/ROB" is found (arrow 824). In an embodiment, the traversing or searching may include skipping over one or more entries using various methods, e.g., pointers, linked lists, etc. The search returns documents D2 and D12.

The foregoing example with respect to FIG. 8 illustrates an exemplary multifaceted search query that requires a single search of the MD inverted index 820 and no Boolean operations. The processing time necessary to evaluate a multifaceted search query using the MD inverted index 820 may be expected to take approximately the same amount of processing time without regard to whether one or two index terms are included in the search query. Moreover, a multifaceted search query using the MD inverted index 820 may be expected to take less processing time than the same multifaceted search using the inverted index 620.

FIG. 9 is a portion of an exemplary record-level multi-dimensional ("MD") inverted index 920 for the exemplary taxonomy 400 of FIG. 4 in accordance with various embodiments. Each entry in the inverted index 920 associates a combination of three facets (FROM, DATE, and TO) with a posting list of documents in the exemplary collection of documents. The MD inverted index 920 includes a field that lists a combination of facets. Specifically, this field list various subclassifications for the FROM facet illustrated in FIG. 2, various subclassifications for the DATE facet illustrated in FIG. 1, and various subclassifications for the TO facet illustrated in FIG. 3. In addition, the MD inverted index 920 includes a posting list column that identifies documents in the intersection of the posting lists of the associated FROM, DATE, and TO facets. For example, the entry for the triplet combination of FROM/BOB, DATE/2010/Q1/FEB, and TO/JACK (arrow 922) identifies document D6 and D9 as being associated with the intersection of the posting lists for the three facets. All of the DATE and TO subclassifications are shown in FIG. 9 for the BOB classification of the FROM facet. However, the DATE and TO subclassifications for the ROB, BILL, and JACK classifications of the FROM facet 1 are not shown in FIG. 9 because of insufficient available space in the figure, although the MD inverted index 920 includes these elements. In addition, each entry in the MD inverted index 920 may include a field (not shown) that lists quantitative aggregations, such as numerical aggregations over fields of the documents in the posting list, or qualitative aggregations, such as arithmetic or Boolean operations applied to metadata attributes associated with the documents.

Searches of the index 920 are performed on the field that lists a combination of facets. A multifaceted search query using the MD inverted index 920 is performed by the search engine 1152 in a manner similar to that described for the MD inverted indices 720 and 820. For example, consider the multifaceted search query with the following index terms: "facet: FROM/BOB AND facet: DATE/2011/Q4/DEC AND facet: TO/BILL." In FIG. 9, the MD inverted index 920 is traversed (or otherwise searched) until the entry that matches these index terms is found (arrow 924). The search returns document D8.

The foregoing example with respect to FIG. 9 illustrates an exemplary multifaceted search query that requires a single search of the MD inverted index 920 and no Boolean operations. The processing time necessary to evaluate a multifaceted search query using the MD inverted index 920 may be expected to take approximately the same amount of processing time without regard to whether one or two or even three index terms are included in the search query. Moreover, a multifaceted search query using the MD inverted index 920 may be expected to take less processing time than the same multifaceted search using the inverted index 620.

The exemplary MD inverted indices 720, 820, and 920 are examples in which the posting list identifies documents associated with the intersection of the posting lists for each of the multiple facets in the MD inverted index. In an alternative embodiment, the posting list of a MD inverted index may identify documents associated with the union of posting lists for each of two or more classifications or subclassifications in the MD inverted index, i.e., the set of documents that are in any one classification or subclassification or in more than one of the classifications or subclassifications. In yet another alternative embodiment, the posting list of a MD inverted index may identify documents associated with the symmetric difference of two or more classifications or subclassifications, i.e., the set of documents that are in one of the classifications or subclassifications, but not in their intersection.

The exemplary MD inverted indices 720, 820, and 920 are examples of record-level inverted indices, i.e., the index terms are facets. In an alternative embodiment, a MD inverted index may be a word-level inverted index in which the index terms are words or phrases.

Figure 10:
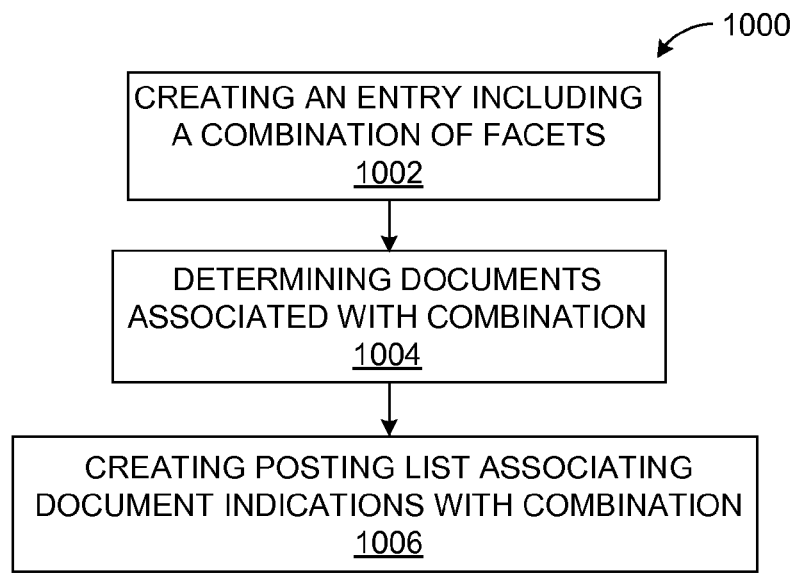
FIG. 10 depicts a process for generating an MD inverted index in accordance with various embodiments.

FIG. 10 depicts a process 1000 for generating an MD inverted index in accordance with various embodiments. Incoming documents are received by an index builder 1150 (see FIG. 11) and one or more MD inverted indices may be generated. In addition, one or more single-dimension inverted indices may be generated. The process 1000 starts with operation 1002 in which an entry is created. Each entry includes a field with a combination of two or more facets. In operation 1004, the index builder 1150 determines which documents are associated with the respective facets of the combination of two or more facets of each entry. The index builder creates a posting list of indications for the documents associated with respective facets of each entry in operation 1006. Each indication identifies a document. In addition, the operation 1006 may include determining quantitative or qualitative aggregations associated with the documents. The index builder may store aggregations in an aggregation field for the entry.

Figure 12:
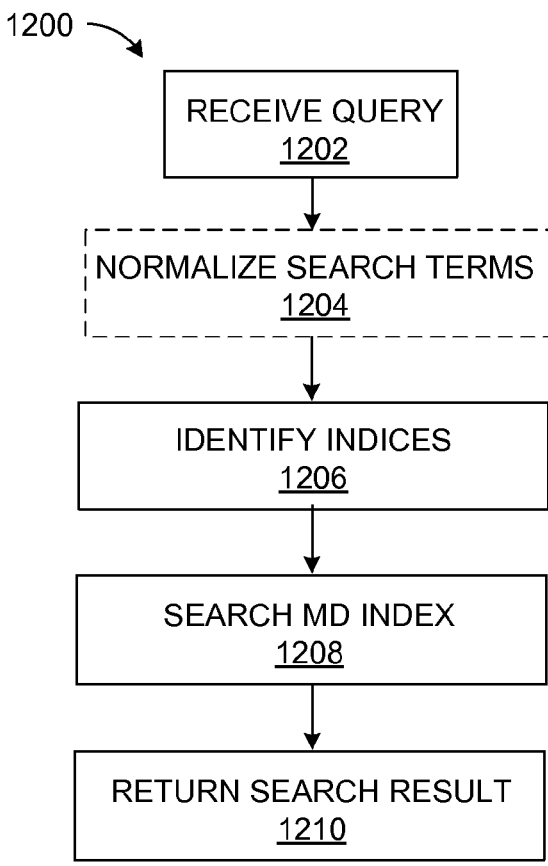
FIG. 12 depicts a process for performing a search query in accordance with various embodiments.

FIG. 12 depicts a process 1200 for performing a search query in accordance with various embodiments. A search query may include one or more index terms. Alternatively, a search query may include one or more index terms and one or more non-index terms. In operation 1202, a search query may be received by search engine 1152. In operation 1204, any index terms in the search query may be normalized, i.e. reordered to conform to the format used by one or more MD indices. In operation 1206, one or more indices to search may be identified. If the search query includes a single index term, an inverted index, such as inverted index 620 (FIG. 6), may be identified in operation 1206. If the search query includes a two or more index terms, a MD inverted index, such as MD inverted indices 720, 820, or 920 (FIG. 7, 8, or 9), may be identified in operation 1206. In operation 1208, the selected index is searched until a match is found. In operation 1208, the search engine 1152 may return search results to a user.

Process 1200 generates search results that may include no documents or one or more documents. The content of any documents found in the search results may be searched following the completion of process 1200. As one example, documents found in the search results may be searched for the occurrence of a non-indexed term or phrase.

Figure 11:
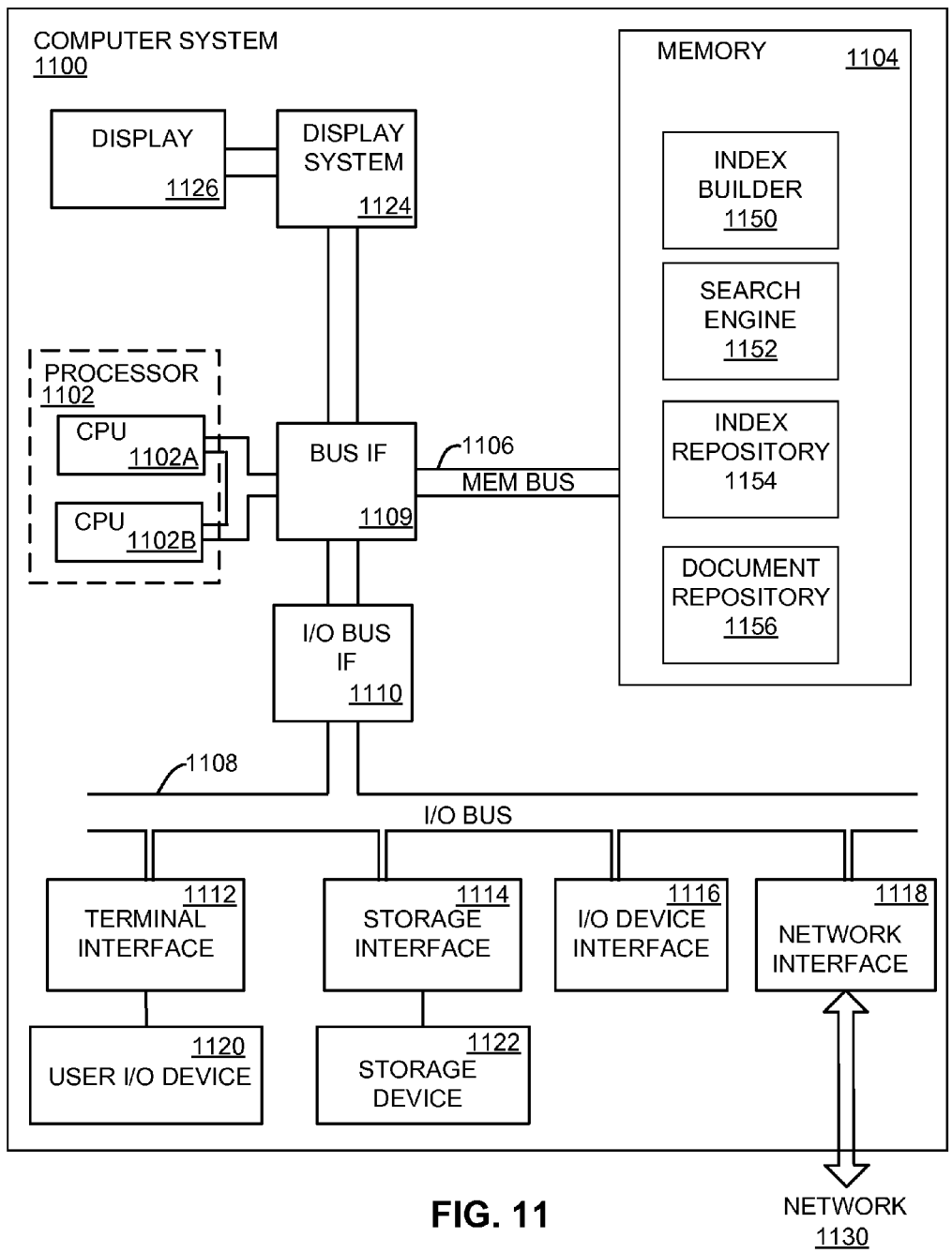
FIG. 11 is a block diagram of a computer system in accordance with various embodiments.

FIG. 11 depicts a high-level block diagram of an exemplary computer system 1100 for implementing various embodiments. The mechanisms and apparatus of the various embodiments disclosed herein apply equally to any appropriate computing system. The major components of the computer system 1100 include one or more processors 1102, a memory 1104, a terminal interface 1112, a storage interface 1114, an I/O (Input/Output) device interface 1116, and a network interface 1118, all of which are communicatively coupled, directly or indirectly, for inter-component communication via a memory bus 1106, an I/O bus 1108, bus interface unit 1109, and an I/O bus interface unit 1110.

The computer system 1100 may contain one or more general-purpose programmable central processing units (CPUs) 1102A and 1102B, herein generically referred to as the processor 1102. In an embodiment, the computer system 1100 may contain multiple processors; however, in another embodiment, the computer system 1100 may alternatively be a single CPU system. Each processor 1102 executes instructions stored in the memory 1104 and may include one or more levels of on-board cache.

In an embodiment, the memory 1104 may include a random-access semiconductor memory, storage device, or storage medium (either volatile or non-volatile) for storing or encoding data and programs. In another embodiment, the memory 1104 represents the entire virtual memory of the computer system 1100, and may also include the virtual memory of other computer systems coupled to the computer system 1100 or connected via a network. The memory 1104 is conceptually a single monolithic entity, but in other embodiments the memory 1104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 1104 may store all or a portion of the following: an index builder 1150, a search engine 1152, an index repository 1154, and a document repository 1156. These programs and data structures are illustrated as being included within the memory 1104 in the computer system 1100, however, in other embodiments, some or all of them may be on different computer systems and may be accessed remotely, e.g., via a network. The computer system 1100 may use virtual addressing mechanisms that allow the programs of the computer system 1100 to behave as if they only have access to a large, single storage entity instead of access to multiple, smaller storage entities. Thus, while the index builder 1150, search engine 1152, index repository 1154, and document repository 1156 are illustrated as being included within the memory 1104, these components are not necessarily all completely contained in the same storage device at the same time. Further, although the index builder 1150, search engine 1152, index repository 1154, and document repository 1156 are illustrated as being separate entities, in other embodiments some of them, portions of some of them, or all of them may be packaged together.

In an embodiment, the index builder 1150 and search engine 1152 may include instructions or statements that execute on the processor 1102 or instructions or statements that are interpreted by instructions or statements that execute on the processor 1102 to carry out the functions as further described below. In another embodiment, the index builder 1150 and search engine 1152 are implemented in hardware via semiconductor devices, chips, logical gates, circuits, circuit cards, and/or other physical hardware devices in lieu of, or in addition to, a processor-based system. In an embodiment, the index builder 1150 and search engine 1152 may include data in addition to instructions or statements.

The index builder 1150 may include various processes that generate one or more MD inverted indices according to various embodiments. The search engine 1152 may include various processes searching inverted indices or MD inverted indices according to various embodiments. The index repository 1154 may include one or more inverted indices and one or more MD inverted indices according to various embodiments. For example, the index repository 1154 may include the inverted index 620, and the MD inverted indices 720, 820, 920. In addition, the document repository 1156 may include two or more documents. For example, the document repository 1156 may include the documents D1-12.

The computer system 1100 may include a bus interface unit 1109 to handle communications among the processor 1102, the memory 1104, a display system 1124, and the I/O bus interface unit 1110. The I/O bus interface unit 1110 may be coupled with the I/O bus 1108 for transferring data to and from the various I/O units. The I/O bus interface unit 1110 communicates with multiple I/O interface units 1112, 1114, 1116, and 1118, which are also known as I/O processors (IOPs) or I/O adapters (IOAs), through the I/O bus 1108. The display system 1124 may include a display controller, a display memory, or both. The display controller may provide video, audio, or both types of data to a display device 1126. The display memory may be a dedicated memory for buffering video data. The display system 1124 may be coupled with a display device 1126, such as a standalone display screen, computer monitor, television, or a tablet or handheld device display. In one embodiment, the display device 1126 may include one or more speakers for rendering audio. Alternatively, one or more speakers for rendering audio may be coupled with an I/O interface unit. In alternate embodiments, one or more of the functions provided by the display system 1124 may be on board an integrated circuit that also includes the processor 1102. In addition, one or more of the functions provided by the bus interface unit 1109 may be on board an integrated circuit that also includes the processor 1102.

The I/O interface units support communication with a variety of storage and I/O devices. For example, the terminal interface unit 1112 supports the attachment of one or more user I/O devices 1120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 1120 and the computer system 1100, and may receive output data via the user output devices. For example, a user interface may be presented via the user I/O device 1120, such as displayed on a display device, played via a speaker, or printed via a printer.

The storage interface 1114 supports the attachment of one or more disk drives or direct access storage devices 1122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 1122 may be implemented via any type of secondary storage device. The contents of the memory 1104, or any portion thereof, may be stored to and retrieved from the storage device 1122 as needed. The I/O device interface 1116 provides an interface to any of various other I/O devices or devices of other types, such as printers or fax machines. The network interface 1118 provides one or more communication paths from the computer system 1100 to other digital devices and computer systems; these communication paths may include, e.g., one or more networks.

Although the computer system 1100 shown in FIG. 11 illustrates a particular bus structure providing a direct communication path among the processors 1102, the memory 1104, the bus interface 1109, the display system 1124, and the I/O bus interface unit 1110, in alternative embodiments the computer system 1100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 1110 and the I/O bus 1108 are shown as single respective units, the computer system 1100 may, in fact, contain multiple I/O bus interface units 1110 and/or multiple I/O buses 1108. While multiple I/O interface units are shown, which separate the I/O bus 1108 from various communications paths running to the various I/O devices, in other embodiments, some or all of the I/O devices are connected directly to one or more system I/O buses.

In various embodiments, the computer system 1100 is a multi-user mainframe computer system, a single-user system, or a server computer or similar device that has little or no direct user interface, but receives requests from other computer systems (clients). In other embodiments, the computer system 1100 may be implemented as a desktop computer, portable computer, laptop or notebook computer, tablet computer, pocket computer, telephone, smart phone, or any other suitable type of electronic device.

FIG. 11 is intended to depict the representative major components of the computer system 1100. Individual components, however, may have greater complexity than represented in FIG. 11, components other than or in addition to those shown in FIG. 11 may be present, and the number, type, and configuration of such components may vary. Several particular examples of additional complexity or additional variations are disclosed herein; these are by way of example only and are not necessarily the only such variations. The various program components illustrated in FIG. 11 may be implemented, in various embodiments, in a number of different manners, including using various computer applications, routines, components, programs, objects, modules, data structures, etc., which may be referred to herein as "software," "computer programs," or simply "programs."

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the viewer's computer, partly on the viewer's computer, as a stand-alone software package, partly on the viewer's computer and partly on a remote computer, or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method of searching, comprising:
   receiving a query including two or more facets of a single multidimensional inverted index for a collection of documents, each document being associated with at least one facet, wherein the query further includes one or more non-index terms;
   wherein the single multidimensional inverted index is generated by:
      creating one or more entries, each entry including a combination of two or more facets, wherein each of the two or more facets is not a sub-category of any other facet of the two or more facets,
      determining documents associated with respective facets of the combination of two or more facets of each entry, and
      creating a posting list of indications for the documents associated with respective facets of each entry, each indication identifying a document;
   determining a format of the single multidimensional inverted index, wherein the format includes an order of the two or more facets in the single multidimensional inverted index;
   normalizing the query to conform to the format of the single multidimensional inverted index, wherein the normalizing includes reordering the two or more facets in the query, the reordered two or more facets having the same order as the two or more facets in the single multidimensional inverted index;
   searching the single multidimensional inverted index for an entry having the combination of two or more facets included in the query;
   identifying, based on the searching the single multidimensional inverted index, a set of documents having the combination of two or more facets included in the query;
   searching the set of documents for the one or more non-index terms;
   generating a search result, wherein the search result includes only documents of the set of documents that include the one or more non-index terms; and
   returning the search result.

2. The method of claim 1, wherein the determining of documents associated with respective facets of the combination of two or more facets of each entry includes determining that a first document is associated with each facet of the two or more facets.

3. The method of claim 1, wherein the determining of documents associated with respective facets of the combination of two or more facets of each entry includes determining that a first document is associated with at least one facet of the two or more facets.

4. The method of claim 1, wherein the determining of documents associated with respective facets of the combination of two or more facets of each entry includes determining that a first document is associated with only one facet of the two or more facets.

5. The method of claim 1, further comprising selecting the single multidimensional inverted index for the collection of documents from first and second multidimensional inverted indices for the collection of documents based on the two or more facets included in the query.

6. The method of claim 1, wherein at least one of the one of more entries of the single multidimensional inverted index is generated prior to receiving the query.

7. A computer program product for searching, the computer program product comprising a non-transitory computer readable storage medium having program code embodied therewith, the program code comprising computer readable program code configured to:
   receive a query including two or more facets of a single multidimensional inverted index for a collection of documents, each document being associated with at least one facet, wherein the query further includes one or more non-index terms;
   wherein the single multidimensional inverted index is generated by:
      creating one or more entries, each entry including a combination of two or more facets, wherein each of the two or more facets is not a sub-category of any other facet of the two or more facets,
      determining documents associated with respective facets of the combination of two or more facets of each entry, and
      creating a posting list of indications for the documents associated with respective facets of each entry, each indication identifying a document;
   determine a format of the single multidimensional inverted index, wherein the format includes an order of the two or more facets in the single multidimensional inverted index;
   normalize the query to conform to the format of the single multidimensional inverted index by reordering the two or more facets in the query, the reordered two or more facets having the same order as the two or more facets in the single multidimensional inverted index;
   search the single multidimensional inverted index for an entry having the combination of two or more facets included in the query;
   identify, based on the searching the single multidimensional inverted index, a set of documents having the combination of the first and second facets included in the query;
   search the set of documents for the one or more non-index terms;
   generate a search result, wherein the search result includes only documents of the set of documents that include the one or more non-index terms; and
   return the search result.

8. The computer program product of claim 7, wherein the determining of documents associated with respective facets of the combination of two or more facets of each entry includes determining that a first document is associated with each facet of the two or more facets.

9. The computer program product of claim 7, wherein the determining of documents associated with respective facets of the combination of two or more facets of each entry includes determining that a first document is associated with at least one facet of the two or more facets.

10. The computer program product of claim 7, wherein the determining of documents associated with respective facets of the combination of two or more facets of each entry includes determining that a first document is associated with only one facet of the two or more facets.

11. The computer program product of claim 7, further comprising selecting the single multidimensional inverted index for the collection of documents from first and second multidimensional inverted indices for the collection of documents based on the two or more facets included in the query.

12. The computer program product of claim 7, wherein at least one of the one of more entries of the single multidimensional inverted index is generated prior to receiving the query.

13. The method of claim 1, wherein the two or more facets of the query are selected by a user checking boxes in a user interface.

14. The method of claim 1, wherein the single multidimensional array includes a field having a number of documents for each facet.

15. The method of claim 1, wherein the single multidimensional array includes a field having a frequency of the two or more facets in the document.

16. The method of claim 1, the method further comprising:
    adding a new document to the collection of documents; and
    generating a document record for the new document, the document record including an identifier and values for each facet associated with the new document.

17. The method of claim 1, wherein the single multidimensional inverted index further includes:
    a first field for each entry, the first field listing quantitative aggregations for each entry; and
    a second field for each entry, the second field listing qualitative aggregations for each entry.

* * * * *